(12) United States Patent
Oh

(10) Patent No.: US 6,265,949 B1
(45) Date of Patent: Jul. 24, 2001

(54) PHASE COMPENSATION APPARATUS AND METHOD FOR A DIGITAL MODULATOR

(75) Inventor: Inn Yeal Oh, Kyonggi-do (KR)

(73) Assignee: LG Information & Communications, Ltd., Seoul (KR)

( * ) Notice: Subject to any disclaimer, the term of this patent is extended or adjusted under 35 U.S.C. 154(b) by 0 days.

(21) Appl. No.: 09/469,311

(22) Filed: Dec. 22, 1999

(51) Int. Cl.[7] .............................. H04B 17/00; H04L 27/36
(52) U.S. Cl. .................... 332/103; 348/724; 375/298; 375/308
(58) Field of Search ........................ 332/103, 104, 332/105; 375/261, 298, 279, 308; 348/724

(56) References Cited

U.S. PATENT DOCUMENTS

| | | | | |
|---|---|---|---|---|
| 4,249,214 | * | 2/1981 | Boyd | 348/724 |
| 4,717,894 | * | 1/1988 | Edwards et al. | 332/144 |
| 5,371,481 | * | 12/1994 | Tiittanen et al. | 332/103 |
| 5,847,619 | * | 12/1998 | Kirisawa | 332/103 |
| 5,886,584 | * | 3/1999 | Tanai et al. | 332/103 |

* cited by examiner

Primary Examiner—Siegfried H. Grimm
(74) Attorney, Agent, or Firm—Fleshner & Kim, LLP

(57) ABSTRACT

A phase compensation apparatus and method for a digital modulator which is suitable for maintaining the optimum operating state of the modulator provided in a digital television repeater by reducing the phase distortion produced from the modulator. The phase compensation apparatus includes a test signal generating circuit that generates test signals of a predetermined frequency, a modulator that modulates the test signals, a narrow band amplifying circuit that detects and filters a phase distortion signal included in an output signal of the modulator, a conversion circuit that converts a power level of the phase distortion signal filtered by the narrow band amplifying circuit to a digital value, a central processing unit that determines a phase compensation value for the modulator using the digital value converted by the conversion circuit, and a phase compensation circuit that compensates for a phase error produced in the modulator by pre-distorting input signals of the modulator using the phase compensation value determined by the central processing unit.

31 Claims, 4 Drawing Sheets

PHASE COMPENSATION APPARATUS AND METHOD FOR A DIGITAL MODULATOR

BACKGROUND OF THE INVENTION

1. Field of the Invention

The invention relates to a digital television repeater, and more particularly, to a phase compensation apparatus and method for a digital modulator.

2. Background of the Related Art

Generally, a digital television repeater is provided in a digital broadcasting system. The digital repeater performs the function of repeating a digital broadcasting signal to be transmitted to subscribers located in a radio wave shade area that the broadcasting signal does not reach or in a poor reception area. In other words, the digital television repeater receives a weak broadcasting signal transmitted from a digital broadcast transmitter, amplifies the broadcasting signal, and then transmits the amplified broadcasting signal through a desired channel frequency so that subscribers in the radio wave shade area or in the poor reception area can receive the broadcasting signal.

FIG. 1 is a block diagram schematically illustrating a partial construction of a conventional digital television broadcasting system. The conventional digital television broadcasting system includes a television broadcasting station 100, a digital broadcast transmitter 101 for receiving a digital broadcasting signal from the broadcasting station 100 and transmitting the digital broadcasting signal to subscribers, and digital television repeaters 102 and 103 for amplifying and repeating the weak digital broadcasting signal transmitted from the digital broadcast transmitter 101 to serve an radio wave shade area or areas.

If it is assumed that the digital broadcast transmitter 101 transmits the digital broadcasting signal through a frequency F1, the digital television repeaters 102 and 103 located adjacent to the digital broadcast transmitter 101 can repeat the digital broadcasting signal with a predetermined quality even though they use channels different from the channel used by the digital broadcast transmitter 101. Thus, they repeat the digital broadcasting signal using frequencies F2 and F3, respectively. Also, they may repeat a broadcasting signal from another digital television repeater (not illustrated) located adjacent to the digital television repeaters 102 and 103.

FIG. 2 is a block diagram schematically illustrating one of the digital television repeater shown in FIG. 1. The digital television repeater includes a receiving antenna 200 for receiving a weak digital broadcasting signal, a receiver 201 for converting the weak digital broadcasting signal received through the receiving antenna 200 to an intermediate frequency (IF) band signal, a transmitter 202 for modulating the IF digital broadcasting signal converted by the receiver 201 to a required frequency band signal, and a transmission antenna 203 for transmitting the digital broadcasting signal modulated by the transmitter 202 to the subscribers.

FIG. 3 is a block diagram schematically illustrating the transmitter shown in FIG. 2. The transmitter includes a modulator 300 for converting the digital broadcasting signal, which is composed of audio and video signals and transmitted from the receiver as an MPEG-II transport stream signal, to a required frequency band signal, a filter 301 for converting the digital broadcasting signal converted by the modulator 300 to a radio frequency (RF) signal, and a high-output amplifier 302 for amplifying the RF digital broadcasting signal outputted from the filter 301. A power supply 303 supplies a required power to the modulator 300, filter 301, and high-output amplifier 302.

FIG. 4 is a block diagram schematically illustrating the modulator shown in FIG. 3. The modulator includes a signal forming circuit 400 for changing an MPEG-II transport stream signal inputted from the receiver to a quadrature phase signal (hereinafter referred to as a Q signal), a first digital-to-analog (D/A) converter 401 for converting an in-phase signal (hereinafter referred to as an I signal) of the MPEG-II signal inputted from the receiver into an analog signal, a second digital-to-analog (D/A) converter 402 for converting the Q signal into an analog signal, and a quadrature modulation circuit 403 for modulating the I and Q signals to required band signals using two quadrature carriers.

The quadrature modulation circuit 403 comprises a first mixer 404 for multiplying the I signal, which is outputted from the first D/A converter 401 as an analog signal, by a sine wave carrier $SinW_ct$, a second mixer 406 for multiplying the Q signal, which is outputted from the second D/A converter 402 as an analog signal, by a cosine wave carrier $CosW_ct$, and a summer 407 for summing the I and Q signals modulated by and outputted from the first and second mixers 404 and 406.

The MPEG-II transport stream signal transmitted from the receiver is inputted to the first D/A converter 401 and the signal forming circuit 400, and the signal forming circuit 400 produces the Q signal by delaying the phase of the inputted MPEG-II transport stream signal by 90 degrees, and inputs the phase-delayed signal to the second D/A converter 402. The MPEG-II transport stream signal inputted to the first D/A converter 401 will be the I signal.

The digital I and Q signals inputted to the first and second D/A converters 401 and 402 are then converted to analog signals, respectively, and the converted analog signals are inputted to the quadrature modulation circuit 403. The first mixer 404 in the quadrature modulation circuit 403 modulates the input I signal by multiplying the I signal by the the sine wave carrier $SinW_ct$ having a frequency of a required band, and the second mixer 406 modulates the input Q signal by multiplying the Q signal by the cosine wave carrier $CosW_ct$ having a frequency of a required band. Thereafter, the modulated I and Q signals outputted from the first and the second mixers 404 and 406 are summed by the summer 407.

The conventional digital television repeater as described above, is commonly located on a high mountain or in a desolate place to serve the radio wave shade area or the poor reception area, and thus suffers from at least the following problem.

First, since the high mountain or the desolate place where the digital television repeater is located undergoes a great change in environment, such as temperature and humidity, respective elements constituting the transmitter deteriorate. Distortion may occur in the I and Q signals. The modulator then outputs the digital broadcasting signal including a phase error so that the subscribers cannot enjoy digital broadcasting service of a predetermined quality.

Second, since the digital television repeater transmits the digital broadcasting signal with a high output of more that 1 KW, the phase distortion in the modulator exerts a serious influence upon other adjacent channels.

Third, in the event that the modulator of the transmitter in the digital television repeater operates abnormally, the system operator should perform a manual compensation work using an instrument. However, considering that the digital television repeater is located on a high mountain or desolate place, a great loss of time and manpower results.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

The invention is directed to a phase compensation apparatus and method for a digital modulator that substantially obviate at least one or more of the above-described problems and disadvantages.

An object of the invention is to maintain the optimum operating state of the modulator, preferably, provided in a digital television repeater.

It is another object of the invention to reduce the phase distortion produced from the modulator.

It is another object of the invention to maintain the optimum operating state of the modulator at an initial operation of the modulator or at a desired time in accordance with a command of the system operator.

To achieve at least these and other advantages and in accordance with the purpose of the invention, as embodied and broadly described, the phase compensation apparatus for a digital modulator comprises: a test signal generating circuit that generates test signals of a predetermined frequency; a modulator that modulates the test signals; a narrow band amplifying section that detects and filters a phase distortion signal included in an output signal of the modulator; a conversion circuit that converts a power level of the phase distortion signal filtered by the narrow band amplifying circuit to a digital value; a central processing unit that determines a phase compensation value for the modulator using the digital value converted by the conversion circuit; and a phase compensation circuit that compensates for a phase error produced in the modulator by pre-distorting input signals of the modulator using the phase compensation value determined by the central processing unit.

In another aspect of the invention, there is provided a phase compensation method for a digital modulator comprising the steps of generating and providing to the modulator test signals of a predetermined frequency; initializing a phase compensation value for compensating for a phase error of the modulator; measuring a phase distortion signal included in the test signals by monitoring the test signals outputted from the modulator; determining an optimum phase compensation value whereby a size of the measured phase distortion signal is minimized by increasing the initialized phase compensation value and applying the increased phase compensation value to the test signals; and compensating for the phase error of the modulator using the determined phase compensation value.

In an additional aspect of the invention, there is provided a phase compensation method for a digital modulator comprising the steps of generating and providing to the modulator test signals of a predetermined frequency, initializing a phase compensation value for compensating for a phase error of the modulator, measuring a first phase distortion signal included in the test signals by monitoring the test signals outputted from the modulator after applying the initialized phase compensation value, measuring a second phase distortion signal of the modulator by increasing the initialized phase compensation value by 16 grades and applying the increased phase compensation value to the test signals, comparing the measured first phase distortion signal with the second phase distortion signal, repeatedly performing increasing of the increased phase compensation value by 16 grades if the measured first phase distortion signal is larger than the second phase distortion signal as a result of comparison, applying of the phase compensation value increased by 16 grades to the test signals, and then measuring of a third phase distortion signal of the modulator decreasing by 16 grades the phase compensation value at the time point that the measured third phase distortion signal becomes larger than the measured first phase distortion signal, increasing by 1 grade the phase compensation value decreased by 16 grades, applying the phase compensation value increased by 1 grade to the test signals, and measuring a fourth phase distortion signal of the modulator, comparing the measured third phase distortion signal with the fourth phase distortion signal, repeatedly performing increasing of the decreased phase compensation value by 1 grade if the measured third phase distortion signal is larger than the fourth phase distortion signal as a result of comparison and measuring of a fifth phase distortion signal of the modulator, determining an optimum phase compensation value by decreasing by 1 grade the phase compensation value at the time point that the measured fifth phase distortion signal becomes larger than the measured third phase distortion signal, and compensating for the phase error of the modulator using the determined phase compensation value. Further, the phase compensation method is preferably performed when a power is initially supplied to the modulator or when a phase compensation command is inputted after an operation of the modulator. Additionally, the test signals are preferably a first test signal of a predetermined frequency, and a second test signal having a quadrature phase to the first test signal.

In a further aspect of the invention, there is provided a phase compensation apparatus comprising a test signal generating circuit for generating test signals of a predetermined frequency, a modulator for modulating the test signals, and a feedback circuit that analyzes an output signal of the modulator and inputs a signal into the modulator to compensate for a phase error produced in the modulator.

In a still further aspect of the invention, there is provided a phase compensation apparatus comprising test signal generating means for generating test signals of a predetermined frequency, modulator means for modulating the test signals, and feedback means for analyzing an output signal of the modulator and inputting a signal into the modulator means to compensate for a phase error produced in the modulator means.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

The phase compensation apparatus and method according to a preferred embodiment of the invention detects the phase distortion produced from the modulator in the digital to television repeater, calculates and applies a phase compensation value for compensating for the phase distortion so that the modulator can maintain its optimum operating state.

Specifically, the phase compensation apparatus according to a preferred embodiment of the invention can maintain the optimum operating state of the modulator by measuring the phase compensation value for the phase distortion signal produced from the modulator by monitoring the digital broadcasting signal outputted from the modulator when the modulator is initially operated or when a command of the system operator is inputted, and applying the measured phase compensation value to the modulator.

Figure 1:
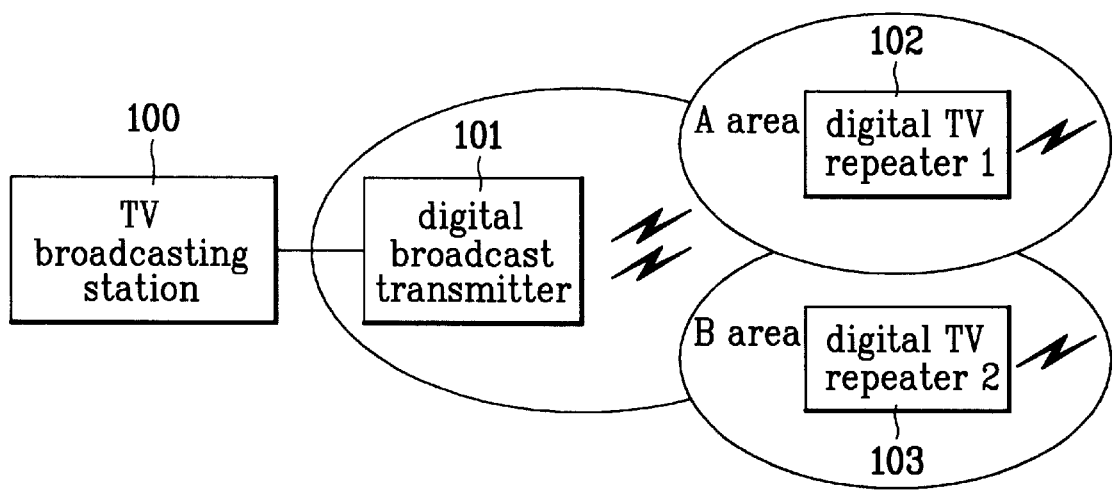
FIG. 1 is a block diagram schematically illustrating a partial construction of a conventional digital television broadcasting system.
Figure 2:
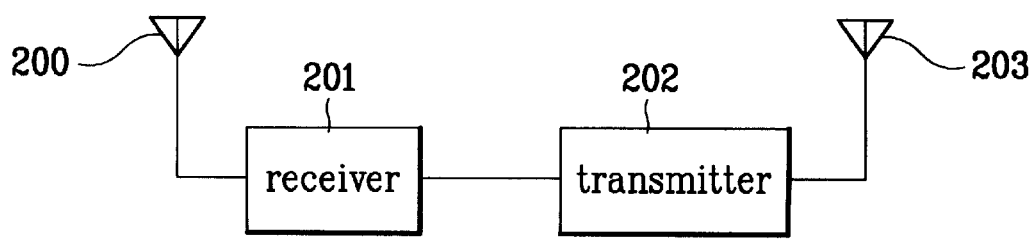
FIG. 2 is a block diagram schematically illustrating the digital television repeater shown in FIG. 1.
Figure 3:
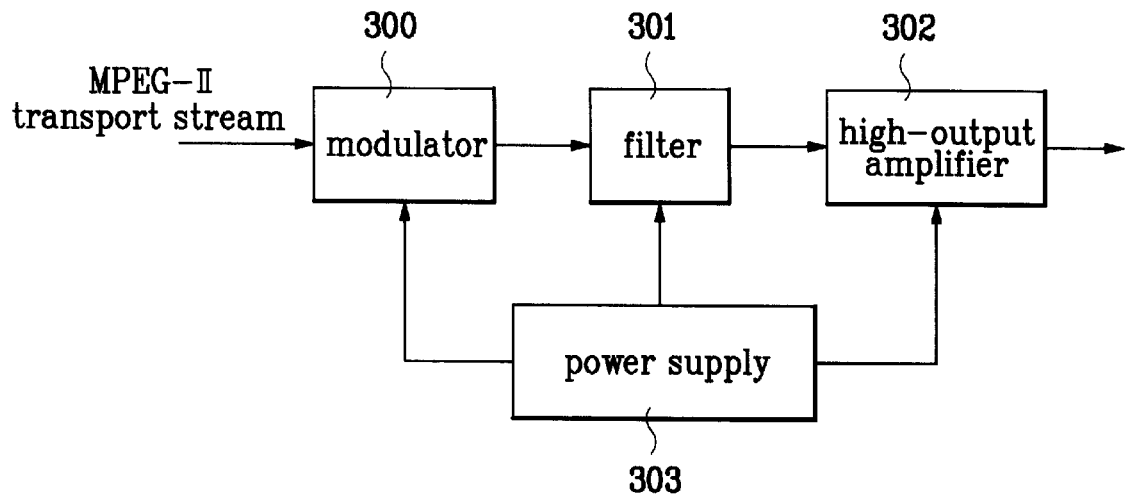
FIG. 3 is a block diagram schematically illustrating the transmitter shown in FIG. 2.
Figure 4:
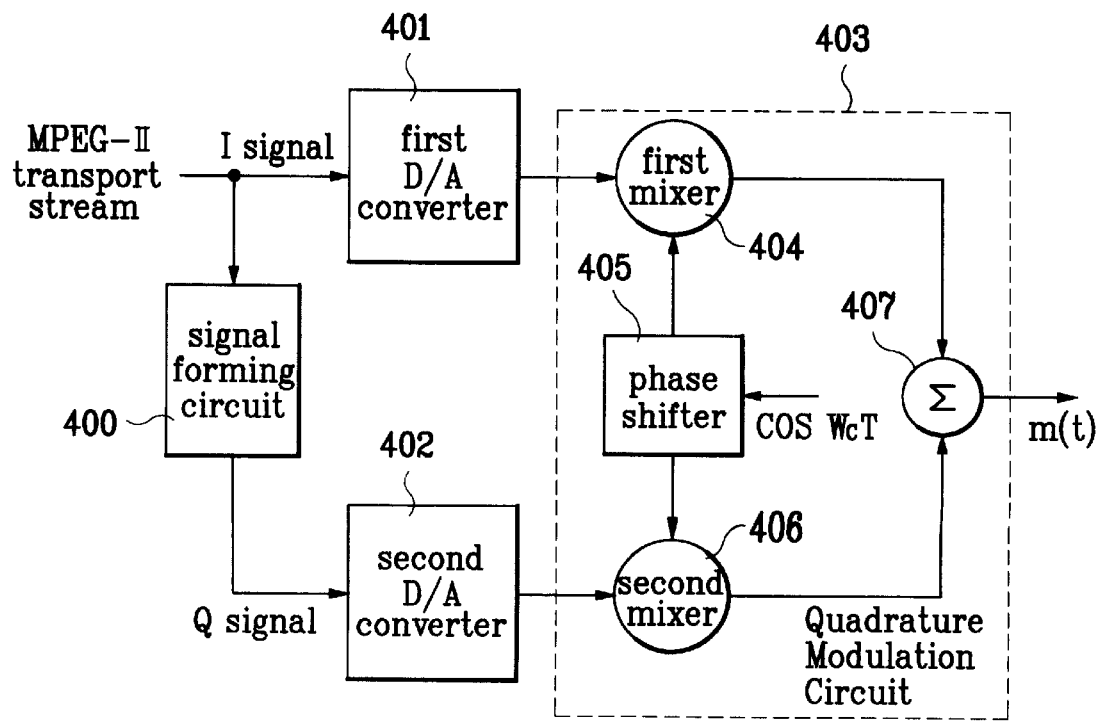
FIG. 4 is a block diagram schematically illustrating the modulator shown in FIG. 3.
Figure 5:
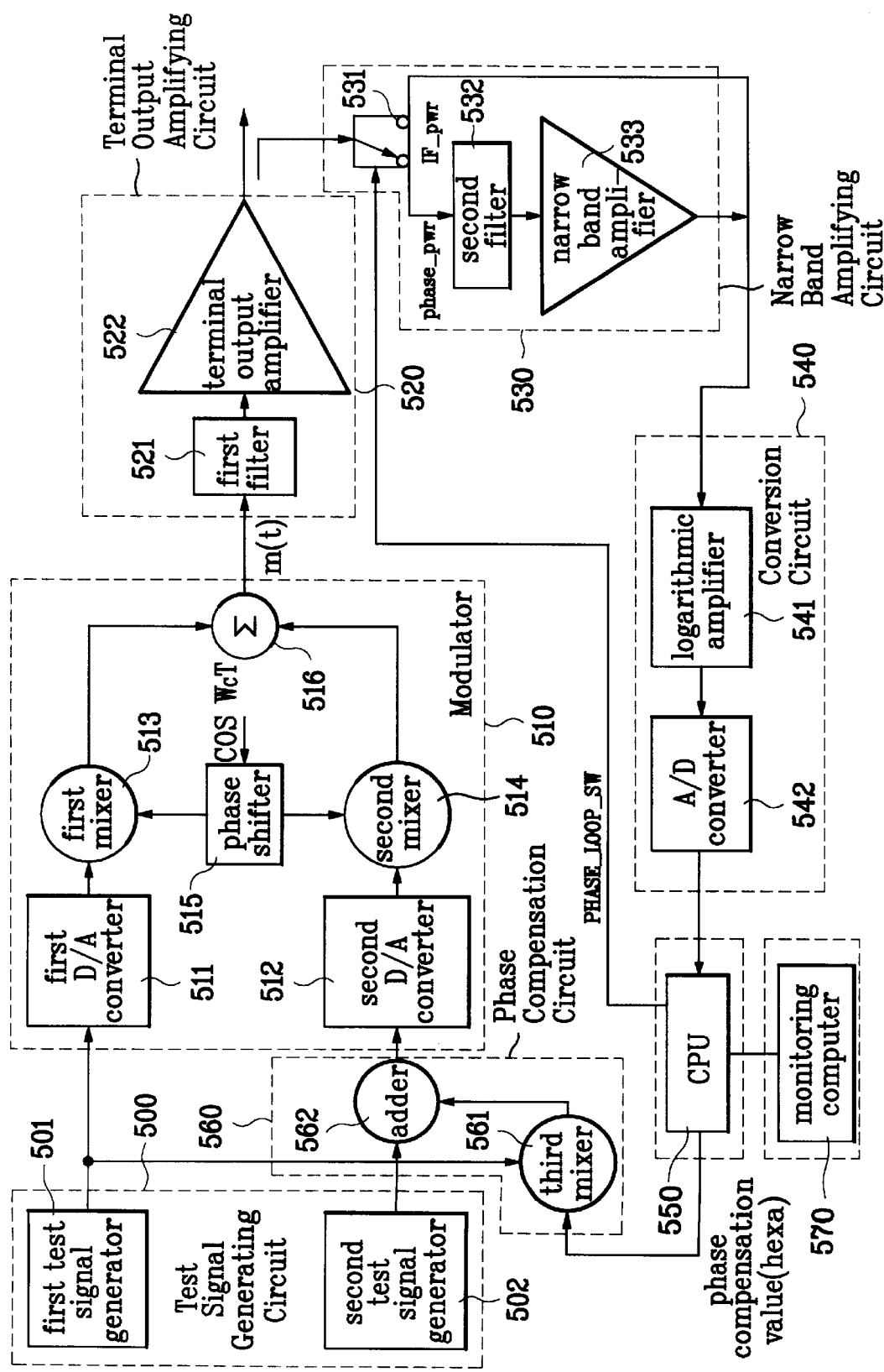
FIG. 5 is a block diagram schematically illustrating the construction of a phase compensation apparatus for a digital modulator according to a preferred embodiment of the invention.

FIG. 5 is a block diagram schematically illustrating a phase compensation apparatus for a digital modulator according to a preferred embodiment of the invention. The phase compensation apparatus for a digital modulator according to the invention includes a test signal generating circuit 500 that generates test signals for testing the operating state of a modulator 510, which receives and modulates the test signals generated from the test signal generating circuit 500, and a terminal output amplifying circuit 520 that filters and amplifies an output signal of the modulator 510. The preferred embodiment further includes a narrow band amplifying circuit 530 that selects and outputs one of a phase distortion signal for the test signal from the terminal output amplifying circuit 520 and a phase distortion signal for a broadcasting signal, and a conversion circuit 540 that converts an analog power level of the phase distortion signal outputted from the narrow band amplifying circuit 530 to a digital voltage value. A central processing unit (CPU) 550 determines an optimum phase compensation value for the modulator 510 using the digital voltage value of the phase distortion signal outputted from the conversion circuit 540, and a phase compensation circuit 560 pre-distorts the input signal of the modulator 510 using the phase compensation value determined by the central processing unit.

The test signal generating circuit 500 comprises a first test signal generator 501 that generates an I (in-phase) signal of a predetermined frequency, and a second test signal generator 502 that generates a Q (quadrature) signal of a predetermined frequency. The modulator 510 comprises a first digital-to-analog (D/A) converter 511 that converts the I signal into an analog signal, a second digital-to-analog (D/A) converter 512 that converts the Q signal into an analog signal, a first mixer 513 that multiplies the I signal outputted from the first D/A converter 511 by a sine wave carrier $SinW_c t$, a second mixer 514 that multiplies the Q signal outputted from the second D/A converter 512 by a cosine wave carrier $CosW_c t$, and a summer 516 that sums the I and Q signals modulated by and outputted from the first and second mixers 513 and 514.

The terminal output amplifying circuit 520 comprises a first filter 521 that filters the output signal of the modulator 510, and a terminal output amplifier 522 that amplifies an output signal of the first filter 521. The narrow band amplifying circuit 530 comprises a switch 531 that selects one of the phase distortion signal for the test signal from the terminal output amplifying section 520 and the phase distortion signal for the broadcasting signal in accordance with a control signal provided from the central processing unit 520, a second filter 532 that filters and outputs one of the phase distortion signal for the test signal and the phase distortion signal for the broadcasting signal in accordance with a selection state of the switch 531, and a narrow band amplifier 533 that amplifies the phase distortion signal outputted from the second filter 532. A narrow band filter may be used as the second filter 532.

The conversion circuit 540 comprises a logarithmic amplifier 541 that detects a power level of the phase distortion signal outputted from the narrow band amplifying circuit 530 and outputting a voltage value of the detected phase distortion signal, and an analog-to-digital (A/D) converter 542 that converts the voltage value of the phase distortion signal outputted from the logarithmic amplifier 541 to a digital voltage value. Also, the phase compensation section 560 comprises a third mixer 561 that multiplies the I signal to be modulated by the phase compensation value determined by the central processing unit 550, and an adder 562 that adds an output signal of the third mixer 561 to the Q signal to be modulated.

The operation of the phase compensation apparatus for a digital modulator according to a preferred embodiment of the invention as constructed above will now be explained. The phase compensation apparatus according to the invention operates in two operating modes.

The first mode is a mode for monitoring the output signal of the modulator 510 with respect to the digital broadcasting signal. In this mode, if the transmitter transmits the general digital broadcasting signal, the switch 531 is switched to its contact IF_PWR, and the output signal of the modulator 510 with respect to the digital broadcasting signal is monitored.

The second mode is a mode for monitoring the output signal of the modulator 510 with respect to the test signal. In this mode, if the transmitter is initially operated or the system operator inputs the phase compensation command for the transmitter using a monitoring computer 570, the switch 531 is switched to its contact PHASE_PWR, and the output signal of the modulator 510 with respect to the test signal is monitored. The monitoring computer 570 may be directly connected to the CPU 550, or may communicate remotely with the CPU 550.

In the above-described two modes, the switch 531 operates in accordance with a control signal PHASE_LOOP_SW provided from the central processing unit 550 to the switch 531.

The reason why the phase compensation apparatus according to preferred embodiment of the invention operates in two modes is that the apparatus should first check whether the modulator 510 operates in a normal state if the power is inputted to the modulator 510 at the initial operation of the transmitter or if the system operator inputs the phase compensation command. In other words, if the modulator 510 operates in an abnormal state and thus its output signal is abnormal, it is meaningless to operate the phase compensation apparatus according to the invention.

Specifically, the phase compensation apparatus according to the invention first operates in the first mode to check whether the modulator 510 operates normally, and if the modulator 510 operates normally, it calculates the optimum phase compensation value for the modulator 510 by generating the test signal when the transmitter is initially operated or the phase compensation command is inputted. At this time, the central processing unit 550 provides the control signal PHASE_LOOP_SW to the switch 531 to monitor the output signal of the modulator 510 with respect to the test signal, and the switch 531 is switched from the contact IF_PWR to the contact PHASE_PWR, so that the central processing unit 550 can detect the phase distortion signal included in the test signal.

Hereinafter, the operation of the phase compensation apparatus at the initial operation of the transmitter or when the phase compensation command is inputted will be explained in detail.

First, when the transmitter is initially operated or the phase compensation command is inputted, the first test signal generator 501 generates the I signal having the frequency of 2.69 MHz, and the second test signal generator 502 generates the Q signal having the frequency of 2.69 MHz, respectively. At this time, the system operator can input the phase compensation command to the modulator through the central processing unit 550 after connecting the modulator to the monitoring computer and then changing the operating mode to a test mode during the operation of the modulator.

The modulator 510 receives the I signal and the Q signal generated from the respective test signal generators 501 and 502. Specifically, the I signal is inputted to the first D/A converter 511 in the modulator 510, and the Q signal is inputted to the second D/A converter 512 in the modulator 510.

Then, the analog I signal converted by the first D/A converter 511 is inputted to the first mixer 513, and the analog Q signal converted by the second D/A converter 512 is inputted to the second mixer 514. The first mixer 513 modulates the input I signal by multiplying the I signal by the sine wave carrier $SinW_ct$ having the frequency band of 46.69 MHz for modulation, and the second mixer 514 modulates the input Q signal by multiplying the Q signal by the cosine wave carrier $CosW_ct$ having the frequency band of 46.69 MHz for modulation.

Thereafter, the modulated I and Q signals outputted from the first and second mixers 513 and 514 are inputted to and summed by the summer 516, and then the summed I and Q signals are inputted to the terminal output amplifying circuit 520.

The first filter 521 in the terminal output amplifying circuit 520 filters the summed signals outputted from the modulator 510, and the terminal output amplifier 522 amplifies the output signal of the first filter 521 to a power level over 1 KW which can be transmitted through a transmission antenna (not illustrated).

At this time, the respective test signals generated from the test signal generating circuit 500 and modulated by the modulator 510 may include a phase distortion signal during the modulation process in accordance with the operating state of the modulator 510, and such a phase distortion signal is filtered by the second filter 532 in the narrow band amplifying circuit 530.

Specifically, in order to compensate for non-linear components produced when the modulated signal outputted from the modulator 510 is amplified, the terminal output amplifying circuit 520 filters and amplifies all the signals in the range of 38~50 MHz that is twice the frequency range of the channel to be transmitted. Specifically, the terminal output amplifying circuit 520 filters and outputs both the normal digital broadcasting signal of 44 MHz which is apart from the carrier of 46.69 MHz, and the phase distortion signal of 49.38 MHz which is included during the modulation process of the modulator 510. Then, the phase distortion signal of 49.38 MHz which is produced due to the phase difference of the modulator 510 is detected by the narrow band amplifying circuit 530 connected to the terminal output amplifier 522, and the detected phase distortion signal is filtered by the second filter 532. Here, the second filter 532 comprises a narrow band filter, and filters the phase distortion signal outputted from the terminal output amplifier 522.

However, if it is assumed that the modulator 510 modulates the test signal with an accurate phase difference, its output signal is produced only at 44 MHz which is in an effective channel width according to the carrier of 46.69 MHz, i.e., in the band of 41 MHz~47 MHz, but no output signal is produced at 49.38 MHz which is the band excepting the effective channel width.

The phase distortion signal outputted from the second filter 532 in the narrow band amplifying circuit 530 is amplified with a predetermined amplification factor by the narrow band amplifier 533, and then inputted to the conversion circuit 540.

The logarithmic amplifier 541 in the conversion circuit 540 detects the power level of the phase distortion signal outputted from the narrow band amplifier 533, and outputs a corresponding voltage value. The A/D converter 542 converts the analog voltage value of the phase distortion signal outputted from the logarithmic amplifier 541 to a digital value.

The central processing unit 550 determines the optimum phase compensation value with respect to the phase error of the modulator 510 using the digital value outputted from the A/D converter 542.

Thereafter, the central processing unit 550 inputs the determined phase compensation value to the phase compensation circuit 560, and the third mixer 561 in the phase compensation circuit 560 multiplies the phase compensation value inputted from the central processing unit 550 by the I signal to output the multiplied value to the adder 562.

The adder 562 adds the signal inputted from the third mixer 561 to the Q signal and thus the Q signal is precompensated for as much as the phase error produced in the modulator 510. Accordingly, the mutual distortion phenomenon due to the phase difference is reduced, and the modulator can operate in the optimum state.

The operation of the phase compensation circuit 560 will now be explained in more detail. The modulator 510 operates to start the I signal at the rising edge and to start the Q signal at the falling edge, and thus the I and Q signals have the phase difference of accurate 90 degree from each other to form more accurate vertical side band (VSB) waveforms. However, as described above, the phase distortion is produced due to the change of the environment or the deterioration of the circuit elements. At this time, the error value caused by the generated phase distortion is given by the following equation 1.

$$Q \times sin(\text{error phase}) \qquad \text{(Equation 1)}$$

where Q denotes a Q signal.

Here, according to the phase compensation method of a preferred embodiment of the invention, since changing the I signal which is an important signal when receiving the digital broadcasting signal possibly causes the generation of another error, the error value added to the Q signal is removed from the Q signal as expressed in equation 1. Accordingly, if the compensated Q signal is Q', the following equation 2 is given.

$$Q'=Q+Ix(-\cos(\text{error})) \quad \text{(Equation 2)}$$

where Q denotes a Q signal prior to being compensated and I denotes an I signal.

Meanwhile, the central processing unit 550 precompensates for the signal to be modulated by the phase compensation circuit 560, and then provides the control signal PHAS_LOOP_SW to the switch 531. The switch 531 is switched from PHASE_PWR to IF_PW in accordance with the control signal PHASE_LOOP_SW provided from the central processing unit 550, and monitors the output signal of the modulator 510.

Figure 6:
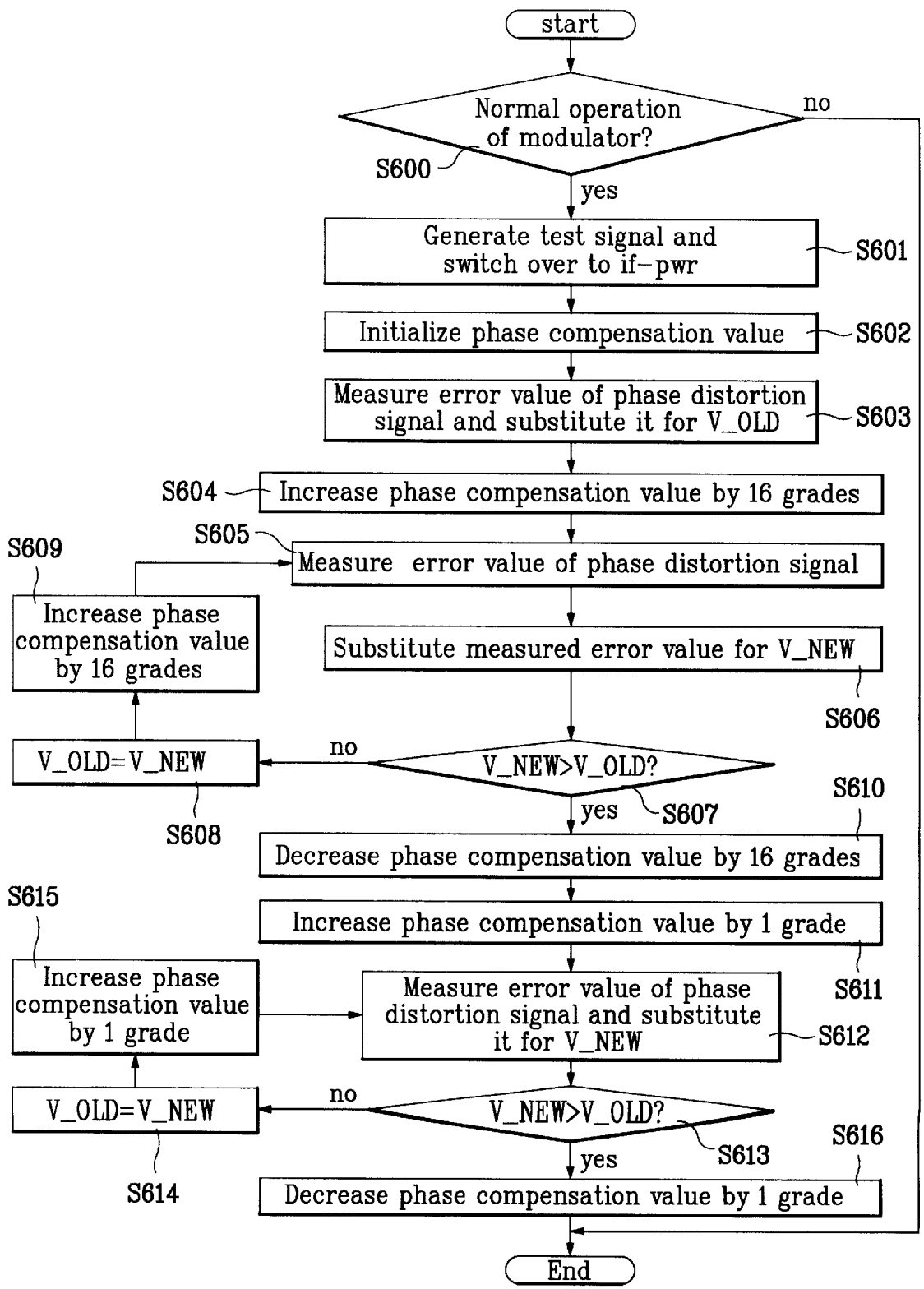
FIG. 6 is a flowchart illustrating a phase compensation method for a digital modulator according to a preferred embodiment of the invention.

FIG. 6 is a flowchart illustrating the phase compensation method for a digital modulator according to a preferred embodiment of the invention. The phase compensation method for a digital modulator according to a preferred embodiment of the invention is automatically performed when the power is supplied to the modulator at the initial operation of the transmitter or when the system operator inputs the phase compensation command in a local mode.

First, when the modulator is initially operated or when the phase compensation command is inputted through the central processing unit by the system operator, the phase compensation apparatus monitors and checks the output signal of the terminal output amplifier to judge whether the modulator operates normally (step S600). At this time, the control signal PHASE_LOOP_SW provided from the central processing unit to the switch is determined to be "1", and accordingly the switch is switched to IF_PWR.

If it is judged that the modulator operates normally as a result of checking, the central processing unit provides the control signal PHASE_LOOP_SW of "0" to the switch so that the switch is switched to PHASE_PWR to detect the phase distortion signal included in the output signal of the modulator, and the test signal generating circuit generates and outputs to the modulator the test signal composed of the I signal and the Q signal (step S601). However, if it is judged that the modulator does not operate normally as the result of checking, performing of the phase compensation method is terminated.

Thereafter, the central processing unit initializes the phase compensation value to '0' (step S602), and measures the phase distortion signal with respect to the test signal provided from the modulator at step S601 after applying the initialized phase compensation value of '0'.

The central processing unit then stores the error value of the measured phase distortion signal by substituting the error value for V_OLD (step S603). Thus, the error value of the phase distortion signal to which the previous phase compensation value is applied is stored in V_OLD.

Thereafter, the central processing unit increases the phase compensation value initialized at step S602 by 16 grades (step S604), and measures the error value of the phase distortion signal by applying the phase compensation value increased by 16 grades (step S605).

The central processing unit then substitutes the error value of the phase distortion signal measured by applying the phase compensation value increased by 16 grades for V_NEW (step S606). Thus, the error value of the phase distortion signal to which the increased phase compensation value is applied is stored in V_NEW.

Thereafter, the central processing unit compares the measured V_OLD (the error value for the initial phase compensation value) with V_NEW (the error value for the phase compensation value increased by 16 grades) (step S607).

If V_OLD is larger than V_NEW as a result of comparison, it means that the phase compensation value increased by 16 grades is not the optimum phase compensation value. In this case, the central processing unit substitutes V_NEW, i.e., the error value measured by applying the phase compensation value increased by 16 grades for V_OLD (step S608), increases the phase compensation value by 16 grades again, and then measures the error value of the corresponding phase distortion signal (steps S609 and S605).

The central processing unit repeatedly performs the above steps S605~S609 until the error value stored in V_OLD becomes smaller than the error value stored in V_NEW.

The reason why the error value of the phase distortion signal is measured by increasing the phase compensation value is to find out the optimum phase compensation value by continuously increasing the phase compensation value since if the initially determined phase compensation value is increased, it means that the modulator, to which the increased phase compensation value is applied, outputs smaller phase distortion signal. Accordingly, if the error value of the phase compensation value increased by 16 grades again is smaller than that of the previous phase compensation value, the central processing unit repeats the above-described loop by increasing the phase compensation value by 16 grades again and again.

Here, the reason why the increasing grades of the phase compensation value are 16 is that the phase compensation value is a hexa value.

The loop is repeated until V_NEW becomes greater than V_OLD, while the phase compensation value varies from '0' (initial hexa value) to 'FF'.

Accordingly, if the phase error value to which the phase compensation value increased by 16 grades is applied becomes greater than that of the previous phase compensation value during the execution of the loop, it means that the previous phase compensation value has a better output, so that the central processing unit escapes the loop and takes the previous phase compensation value by decreasing the phase compensation value by 16 grades (step S610).

Also, the central processing unit finds the optimum phase compensation value by increasing the value by grades smaller than those increased at steps S604~S609.

Specifically, the central processing unit increases by 1 grade the phase compensation value which was decreased by 16 grades at step S610 (step S611), measures the error value of the corresponding phase distortion signal by applying the phase compensation value increased by 1 grade, and then substitutes the measured error value for V_NEW (step S612).

Then, the central processing unit compares the measured value of V_NEW with V_OLD which is the error value for the phase distortion signal to which the phase compensation value is applied before being increased by 1 grade (step S613).

If V_OLD is larger than V_NEW as a result of comparison, the central processing unit substitutes V_NEW for V_OLD (step S614), and increases the phase compensation value by 1 grade again (step S615).

Thereafter, the central processing unit measures the error value of the corresponding phase distortion signal by applying the phase compensation value increased by 1 grade at step S615, substitutes the measured error value for V_NEW, and then compares the value of V_NEW with V_OLD.

The central processing unit repeatedly performs the above loop (steps S612~S615) until the value of V_NEW becomes greater than V_OLD.

If V_NEW becomes greater than V_OLD during the repeated loop process (steps S612~S615), the central processing unit then stores the corresponding value of V_NEW as the phase compensation value, and determines the value which is decreased by 1 grade from V_NEW as the final phase compensation value.

Meanwhile, if the present mode is changed to the test mode during the operation of the modulator, the central processing unit determines the phase compensation value obtained at the initial power input as the initial value, and performs the phase compensation method accordingly.

The phase compensation apparatus and method for a digital modulator according to a preferred embodiment of the invention can be applied to a transceiver of a cable television (CATV) system, a direct broadcasting by satellite (DBS) system, a video on demand (VOD) system, and mobile radio communication system, which employs a modulator of 8 VSB and 16 VSB types, in addition to the digital television repeater.

As described above, the phase compensation apparatus and method for a digital modulator according to a preferred embodiment of the invention can maintain the optimum operating state of the modulator and thus transmit video and audio signals of a predetermined quality to the subscribers by detecting the phase distortion signal produced in the modulator of the transmitter at an initial operation of the modulator or when a command of the system operator is inputted, automatically measuring the phase compensation value using the detected phase distortion signal, and then pre-compensating for the digital broadcasting signal using the measured phase compensation signal.

Also, since the phase compensation apparatus and method according to a preferred embodiment of the invention can control the modulator in the local mode using the monitoring computer after the operation of the modulator, the loss of time and manpower can be reduced in controlling a plurality of digital television repeaters installed in various places as well as a prompt compensation can be performed when the modulator operates abnormally.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A phase compensation apparatus for a digital modulator comprising:
    a test signal generating circuit that generates first and second test signals of a predetermined frequency;
    a modulator for modulating the test signals;
    a narrow band amplifying circuit that detects and filters a phase distortion signal included in an output signal of the modulator;
    a conversion circuit that converts a power level of the phase distortion signal filtered by the narrow band amplifying circuit to a digital value;
    a central processing unit that determines a phase compensation value for the modulator using the digital value converted by the conversion circuit; and
    a phase compensation circuit that compensates for a phase error produced in the modulator by pre-distorting input signals of the modulator using the phase compensation value determined by the central processing unit.

2. The phase compensation apparatus of claim 1, wherein the phase compensation apparatus is applied to a modulator provided in one of the following: a digital television repeater, a communication system, a cable television (CATV) system, a video on demand (VOD) system, and a direct broadcasting by satellite (DBS) system.

3. The phase compensation apparatus of claim 1, wherein the test signal generating circuit comprises:
    a first test signal generator that generates a first test signal of a predetermined frequency; and
    a second test signal generator that generates a second test signal having a quadrature phase to the first test signal.

4. The phase compensation apparatus of claim 3, wherein the first and second test signals have a frequency of 2.69 MHz.

5. The phase compensation apparatus of claim 1, wherein the modulator comprises:
    a first digital-to-analog (D/A) converter that converts the first test signal generated from the test signal generating circuit into an analog signal;
    a second digital-to-analog (D/A) converter that converts the second test signal having a quadrature phase to the first test signal generated from the test signal generating circuit into an analog signal;
    a first mixer that multiplies the first test signal outputted from the first D/A converter as the analog signal by a first carrier of a predetermined frequency;
    a second mixer that multiples the second test signal outputted from the second D/A converter as the analog signal by a second carrier having a quadrature phase to the first carrier; and
    a summer that sums the first and second test signals frequency-converted by and outputted from the first and second mixers, respectively.

6. The phase compensation apparatus of claim 1, wherein the narrow band amplifying circuit comprises:
    a switch that selects either one of the phase distortion signal included in the test signals generated from the test signal generating circuit and the phase distortion signal included in a digital broadcasting signal;
    a filter that filters the phase distortion signal included in the test signals in accordance with a selection state of the switch; and
    an amplifier that amplifies the phase distortion signal filtered by the filter.

7. The phase compensation apparatus of claim 6, wherein the switch selects one of the phase distortion signal included in the test signals and the phase distortion signal included in the digital broadcasting signal in accordance with a control signal provided from the central processing unit.

8. The phase compensation apparatus of claim 1, wherein the conversion circuit comprises:
    a logarithmic amplifier that detects a power level of the phase distortion signal filtered by the narrow band amplifying circuit and converts the power level into a voltage value; and
    an analog-to-digital (A/D) converter that converts the voltage value outputted from the logarithmic amplifier into a digital value.

9. The phase compensation apparatus of claim 1, wherein the phase compensation circuit comprises:

a mixer that multiplies the phase compensation value determined by the central processing unit by an in-phase (I) signal of a digital broadcasting signal to be modulated; and an adder that adds an output signal of the mixer to a quadrature phase (Q) signal of the digital broadcasting signal.

10. A phase compensation method for a digital modulator comprising the steps of:

generating and providing to the modulator test signals of a predetermined frequency;

initializing a phase compensation value for compensating for a phase error of the modulator;

measuring a first phase distortion signal included in the test signals by monitoring the test signals outputted from the modulator after applying the initialized phase compensation value;

determining an optimum phase compensation value whereby a size of the measured phase distortion signal is minimized by increasing the initialized phase compensation value and applying the increased phase compensation value to the test signals; and compensating for the phase error of the modulator using the determined phase compensation value.

11. The phase compensation method of claim 10, wherein a size of the measured phase distortion signal is minimized by increasing the initialized phase compensation value and applying the increased phase compensation value to the test signals.

12. The phase compensation method of claim 10, wherein the phase compensation method is applied to a modulator provided in one of the following: a digital television repeater, a communication system, a cable television (CATV) system, a video on demand (VOD) system, and a direct broadcasting by satellite (DBS) system.

13. The phase compensation method of claim 10, wherein the phase compensation method is performed when a power is initially supplied to the modulator or when a phase compensation command is inputted after an operation of the modulator.

14. The phase compensation method of claim 10, wherein the test signals provided at the test signal providing step are a first test signal of a predetermined frequency, and a second test signal having a quadrature phase to the first test signal.

15. The phase compensation method of claim 10, wherein the optimum phase compensation value determining step comprises the substeps of:

determining a temporary phase compensation value by repeatedly increasing the initialized phase compensation value by 16 grades; and determining the optimum phase compensation value by repeatedly increasing the temporary phase compensation value by 1 grade.

16. The phase compensation method of claim 10, wherein the modulator phase error compensation step comprises the substeps of:

multiplying the phase compensation value by an in-phase (I) signal of a digital broadcasting signal to be modulated; and pre-distorting a quadrature phase (Q) signal of the digital broadcasting signal by adding the in-phase (I) signal multiplied by the phase compensation value to the quadrature phase (Q) signal.

17. The phase compensation method of claim 10, further comprising the steps of:

measuring a first phase distortion signal included in the test signals by monitoring the test signals outputted from the modulator after applying the initialized phase compensation value;

comparing the measured first phase distortion signal with a second phase distortion signal;

repeatedly performing increasing of the increased phase compensation value by 16 grades if the measured first phase distortion signal is larger than the second phase distortion signal as a result of comparison, applying of the phase compensation value increased by 16 grades to the test signals, and then measuring of a third phase distortion signal of the modulator;

decreasing by 16 grades the phase compensation value at the time point that the measured third phase distortion signal becomes larger than the measured first phase distortion signal;

increasing by 1 grade the phase compensation value decreased by 16 grades;

applying the phase compensation value increased by 1 grade to the test signals, and measuring a fourth phase distortion signal of the modulator;

comparing the measured third phase distortion signal with the fourth phase distortion signal;

repeatedly performing increasing of the decreased phase compensation value by 1 grade if the measured third phase distortion signal is larger than the fourth phase distortion signal as a result of comparison and measuring of a fifth phase distortion signal of the modulator; and determining an optimum phase compensation value by decreasing by 1 grade the phase compensation value at the time point that the measured fifth phase distortion signal becomes larger than the measured third phase distortion signal.

18. The phase compensation method of claim 17, wherein the phase compensation method is performed when a power is initially supplied to the modulator or when a phase compensation command is inputted after an operation of the modulator.

19. The phase compensation method of claim 17, wherein the test signals are a first test signal of a predetermined frequency, and a second test signal having a quadrature phase to the first test signal.

20. A phase compensation apparatus comprising:

a test signal generating circuit for generating test signals of a predetermined frequency;

a modulator for modulating the test signals; and a feedback circuit that analyzes an output signal of the modulator and inputs a signal into the modulator to compensate for a phase error produced in the modulator.

21. The phase compensation apparatus of claim 20, wherein the phase compensation apparatus is applied to a modulator provided in one of the following: a digital television repeater, a communication system, a cable television (CATV) system, a video on demand (VOD) system, and a direct broadcasting by satellite (DBS) system.

22. The phase compensation apparatus of claim 20, wherein the test signal generating circuit comprises:

a first test signal generator that generates a first test signal of a predetermined frequency; and a second test signal generator that generates a second test signal having a quadrature phase to the first test signal.

23. The phase compensation apparatus of claim 22, wherein the first and second test signals have a frequency of 2.69 MHz.

24. The phase compensation apparatus of claim 22, wherein the modulator comprises:
- a first digital-to-analog (D/A) converter that converts the first test signal generated from the test signal generating circuit into an analog signal;
- a second digital-to-analog (D/A) converter that converts the second test signal having a quadrature phase to the first test signal generated from the test signal generating circuit into an analog signal;
- a first mixer that multiplies the first test signal outputted from the first D/A converter as the analog signal by a first carrier of a predetermined frequency;
- a second mixer that multiples the second test signal outputted from the second D/A converter as the analog signal by a second carrier having a quadrature phase to the first carrier; and
- a summer that sums the first and second test signals frequency-converted by and outputted from the first and second mixers, respectively.

25. The phase compensation apparatus of claim 20, wherein the feedback circuit comprises:
- a narrow band amplifying circuit that detects and filters a phase distortion signal included in an output signal of the modulator;
- a conversion circuit that converts a power level of the phase distortion signal filtered by the narrow band amplifying circuit to a digital value;
- a central processing unit that determines a phase compensation value for the modulator using a signal included in an output signal of the modulator; and
- a phase compensation circuit that compensates for a phase error produced in the modulator by pre-distorting input signals of the modulator using the phase compensation value determined by the central processing unit.

26. The phase compensation apparatus of claim 25, wherein the narrow band amplifying circuit comprises:
- a switch that selects either one of the phase distortion signal included in the test signals generated from the test signal generating circuit and the phase distortion signal included in a digital broadcasting signal;
- a filter that filters the phase distortion signal included in the test signals in accordance with a selection state of the switch; and
- an amplifier that amplifies the phase distortion signal filtered by the filter.

27. The phase compensation apparatus of claim 26, wherein the switch selects one of the phase distortion signal included in the test signals and the phase distortion signal included in the digital broadcasting signal in accordance with a control signal provided from the central processing unit.

28. The phase compensation apparatus of claim 25, wherein the conversion circuit comprises:
- a logarithmic amplifier that detects a power level of the phase distortion signal filtered by the narrow band amplifying circuit and converts the power level into a voltage value; and
- an analog-to-digital (A/D) converter that converts the voltage value outputted from the logarithmic amplifier into a digital value.

29. The phase compensation apparatus of claim 25, wherein the phase compensation circuit comprises:
- a mixer that multiplies the phase compensation value determined by the central processing unit by an in-phase (I) signal of a digital broadcasting signal to be modulated; and
- an adder that adds an output signal of the mixer to a quadrature phase (Q) signal of the digital broadcasting signal.

30. The phase compensation apparatus of claim 20 configured for use with a digital modulator.

31. A phase compensation apparatus, comprising:
- test signal generating means for generating test signals of a predetermined frequency;
- modulator means for modulating the test signals; and
- feedback means for analyzing an output signal of the modulator and inputting a signal into the modulator means to compensate for a phase error produced in the modulator means.

* * * * *